June 30, 1953     H. M. GEYER     2,643,642
FLUID PRESSURE ACTUATOR AND LOCKING MEANS THEREFOR
Filed March 27, 1952
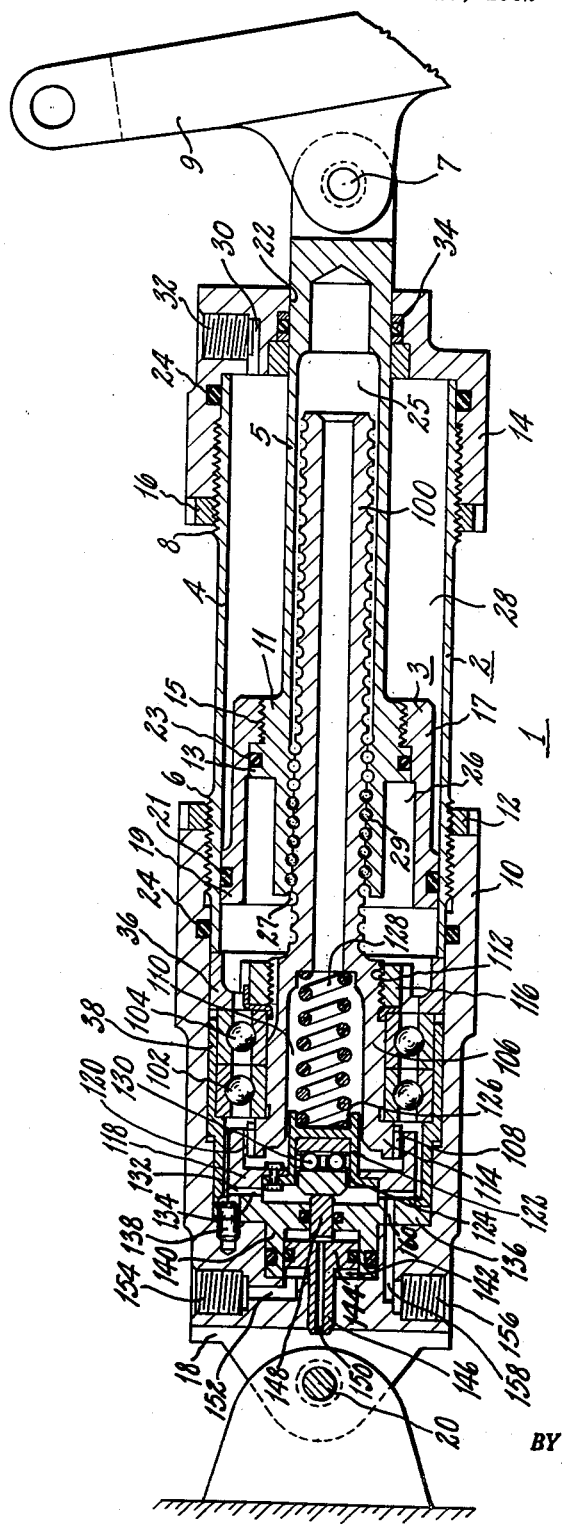
INVENTOR.
HOWARD M. GEYER
BY
His Attorneys Patented June 30, 1953

2,643,642

UNITED STATES PATENT OFFICE 2,643,642

FLUID PRESSURE ACTUATOR AND LOCKING MEANS THEREFOR

Howard M. Geyer, Dayton, Ohio, assignor to General Motors Corporation, Detroit, Mich., a corporation of Delaware Application March 27, 1952, Serial No. 278,844

7 Claims. (Cl. 121—40)

The present invention relates to actuators and more particularly to actuators of the type operated by fluid pressure.

One of my objects is to provide an actuator of sturdy construction and minimum weight so as to be particularly adaptable for operating control surfaces on aircraft.

The aforementioned and other objects are accomplished in the present invention by providing a cylinder within which a piston is mounted for reciprocal movement. The cylinder is provided with two end cap members which form the end walls of the cylinder. The piston has attached thereto a rod provided with an axially extending cylindrical recess, the rod projecting through an aperture in one of the cap members for adjusting a load in the form of an aircraft control surface. A screw shaft, journaled in bearings in the other cap member, threadedly engages a ball-nut device associated with the piston and extends into the cylindrical recess of the piston rod. Associated with the end of the shaft journaled in the bearings is a spring urged locking ring having a plurality of radially extending teeth disposed in contiguous relation to similar teeth formed on a locking collar anchored to the adjacent cap member.

The locking collar is provided with an axially extending skirt which forms the side walls and one end wall of a fluid pressure lock release cylinder. Disposed in the lock release cylinder is a piston having oppositely extending integral rod portions that project through the end walls of the lock release cylinder. One rod portion engages a bearing mounted in a retaining cup formed by the locking ring, and is adapted to disengage the teeth of the locking ring from the teeth of the locking collar upon movement of the lock release piston. The other rod portion is provided with a small passage that provides a relief for fluid trapped behind the lock release piston. Fluid under pressure is applied concurrently to the brake release piston when it is applied to either side of the actuator piston. Accordingly, the locking means are released to allow rotation of the screw shaft and consequent reciprocal movement of the actuated piston whenever fluid pressure is applied to the actuator cylinder.

Further objects and advantages of the present invention will be apparent from the following description, reference being had to the accompanying drawing which shows a longitudinal sectional view of an actuator constructed according to the present invention.

Referring more particularly to the drawing, 1 refers to a fluid pressure operated actuator, and comprises a cylinder 2 having disposed therein a piston 3. The cylinder 2 comprises a tubular member 4 having threaded portions 6 and 8 adjacent opposite ends thereof. A head cap member 10 engages the threads 6 and is retained in position by means of a locking ring 12. Likewise a tail cap member 14 engages the threads 8 and is retained in position by means of a locking ring 16. A bracket 18, formed integral with head cap member 10, has an opening through which a trunnion 20 is inserted for supporting the actuator 1. The tail cap member 14 is provided with an aperture 22 through which a piston rod 5 projects and is linked at 7 to a load device 9. Both the head and tail cap members are undercut to receive seal rings 24.

The piston 3 comprises a head portion 11 which is integral with the rod 5. The head portion 11 is provided with a grooved shoulder 13 and a threaded extension 15. A second head portion 17, provided with a threaded portion engaging the threaded portion 15, has an extension 19 which engages the inner walls of the tubular member 4. The extension 19 is likewise grooved and seal rings 21 and 23 are disposed in the grooved portions 19 and 13 respectively. The piston rod 5 is provided with an axially extending cylindrical recess 25. Likewise head portion 11 is provided with an axially extending cylindrical recess which is semi-circularly grooved at 27. The cylindrical recess in the piston rod 5 is adapted to receive a screw shaft 100 which is journaled in bearings 102 and 104 in the head cap member 10. The screw shaft 100 is likewise provided with semi-circular grooves in its exterior portion which cooperate with the semi-circular grooves 27 in the piston head portion 11 to provide a track and a series of balls 29 disposed therein. Thus the portion of the piston head 11 forms the nut of a ball-nut and screw-connection between the screw shaft 100 and the piston 3. In this manner, a substantially frictionless coupling is afforded by reason of the spiral grooves and the balls 29 disposed therein. The balls 29 may circulate by the assistance of an outer duct carried by the piston 3, not shown. This coupling provides for rotation of the screw shaft 100 in response to reciprocal movement of the piston 3, which moves under the urge of fluid pressure.

The screw shaft 100 is provided with an integral head member 106 which is provided with a radially extending annular flange 114 having axially extending straight spline teeth 108. The head member 106 is further provided with an axially extending recess 110 and an exteriorly threaded portion 112. Lock nut device 116 engages the threaded portion 112 and provides a support for the inner races of bearings 102 and 104 by forcing the inner races of these bearings against a shoulder formed by the flange 114. A locking ring 118, having an axially extending flange provided with axially extending straight splines 120, is concentrically disposed within head cap member 10. The straight splines 108 and 120 of the head member 106 and the locking ring 118 are always in engagement and provide a coupling between the two members. However, by reason of the splines being straight, relative axial movement between the locking ring 118 and the head member 106 can be effected. Attached to the locking ring 108 is a member 122 which forms oppositely extending retaining cups 124 and 126. However, as an alternative construction, not shown, the members 118 and 122 may be integral.

Disposed in recess 110 of the head member 106 is a spring 128 having one end mounted in retaining cup 126 and the other end engaging an end wall of the recess. Disposed in the retaining cup 124 is a thrust bearing 130. The locking ring 118 is additionally provided with a series of radially extending teeth 132 which are disposed in contiguous relation to a series of radially extending teeth 134 which are formed on a locking collar 136. The locking collar 136 is pinned at 138 to the head end cap member 10. Consequently, the locking collar 136 cannot rotate. The locking collar 136 is additionally provided with an axially extending skirt 140 which is disposed in a recess in the head cap member 10. The axially extending skirt 140 forms the side walls and one end wall of a lock release cylinder 142. The other end wall of the lock release cylinder 142 is provided by cap member 10. Disposed within the lock release cylinder is a lock release piston 144 having oppositely extending integral rod portions 146 and 148. The rod portion 148 projects through an end wall of the lock release cylinder 142 and engages the thrust bearing 130. The other rod portion 146 is provided with a bleed passage 150 that allows fluid, trapped behind the piston 144, to be relieved. Lock release cylinder 142 communicates with a passage 152 which in turn communicates with a lock release port 154 in the head cap member 10. The head cap member 10 is further provided with an extending port 156 which communicates with a passage 158 in the head cap member 10, and an opening 160 in the locking collar 136, from which fluid may flow between the engaging teeth 132 and 134 and through the bearings 102 and 104 to an extend chamber 26 of the cylinder 2. The piston 3 divides the cylinder 2 into the extend chamber 26 and a retract chamber 28. The retract chamber 28 is connected by means of passage 30 to a retract port 32 in the tail cap member 14. The ports in the cap members are connected by any suitable means, not shown, to a control valve for the actuator of the type shown in my copending application, Serial No. 78,412, filed February 25, 1949.

Suitable seal means are provided between the lock release cylinder 142 and the head end cap member 10; between the lock release piston 144 and the lock release cylinder 142; and between the rod portion 148 and the locking collar 136. Likewise, seal ring 34 engages the piston rod 5 which extends through the aperture 22 in the tail cap member 14. The head end of tubular member 4 abuts a ring 36 which engages the outer races of the bearings 102 and 104 and confines them between the ring 36 and a shoulder formed on a sleeve 38 disposed within the head cap member 10. The spring 128, disposed in the recess 110 of the head member 106, normally yieldably maintains the radially extending teeth 132 and 134 in engagement. In addition, by reason of the recess 110 being of larger diameter than the wall of the retaining cups 124 and 126, the locking ring 118 can center itself upon the straight splined teeth 108 of the head member 106.

In operation, when fluid under pressure is admitted to either the extend chamber 26 or the retract chamber 28 of the actuator cylinder, is concurrently applied through port 154 and passage 152 to the lock release cylinder 142. This can be accomplished by the control valve disclosed in the copending application, Serial No. 78,412, previously referred to.

When fluid pressure is admitted to the lock release cylinder 142, the lock release piston 144 will move to the right as viewed in the drawing. Movement of the lock release piston to the right will effect axial movement of the locking ring 118 to the right by means of the rod portion 148 engaging the thrust bearing 130. Movement of the locking ring 118 to the right will disengage teeth 134 from teeth 132 and hence allow screw shaft 100 to be rotated. Thus, as fluid pressure is admitted to either of the chambers 26 or 28, the piston will move towards either the head end or the tail end of the cylinder. Reciprocal movement of the piston 3 will effect, through the ball-nut screw-connection, rotation of the shaft 100 which is permitted only when the teeth 132 and 134, forming the locking means, are disengaged. When fluid pressure is admitted to one of the actuator chambers, the other chamber is exposed to drain, thereby allowing movement of the piston 3. Movement of the piston 3 will be transmitted by the rod 5 to the load device 9. However, as soon as fluid pressure is relieved in either of the actuator chambers, it is simultaneously relieved in the lock release cylinder 142. Accordingly, the spring 128 will yieldably urge the teeth 132 and 134 into engagement. When the teeth 132 and 134 are in engagement, rotation of shaft 100 is prevented. Accordingly, the load device 9 is unable to effect reciprocal movement of the piston and the load device 9 will be maintained in the position selected by the actuator.

While the embodiment of the present invention as herein disclosed, constitutes a preferred form, it is to be understood that other forms might be adopted.

What is claimed is as follows:

1. In an actuator of the type having a cylinder and a piston disposed in said cylinder and mounted for reciprocal movement therein under the urge of fluid pressure, movement of said piston being dependent upon rotation of a shaft operatively connected to the piston, locking means operatively connected with said shaft for preventing rotation of said shaft and consequent reciprocal movement of said piston, and fluid pressure operated means for releasing said locking means to permit rotation of said shaft and consequent reciprocal movement of said piston upon the application of fluid pressure to either side of said piston, said locking means comprising a locking collar anchored to said cylinder, a locking ring operatively connected with said shaft, said locking collar having an axially extending skirt and an oppositely extending flange provided with a plurality of radially extending teeth, said locking ring having a plurality of radially extending teeth disposed in contiguous relation to the teeth of said locking collar, and resilient means normally maintaining said teeth in engagement, said release means comprising a cylinder having side walls and an end wall formed by the axially extending skirt of said locking collar, a piston disposed in said cylinder and mounted for reciprocal movement therein, and means integral with said piston for moving said locking ring axially relative to said locking collar to disengage said teeth upon application of fluid pressure to one side of said lock release piston.

2. The combination set forth in claim 1, wherein a member attached to said locking ring forms oppositely extending retaining cups, and wherein a bearing, disposed in one of said retaining cups, is maintained in engagement with said last recited means for transmitting movement of said lock release piston to said locking ring.

3. The combination set forth in claim 2, wherein said shaft is provided with an axially extending cylindrical recess in one end thereof, said retaining cups being supported in said recess and wherein, said resilient means comprises a spring disposed in said recess, one end of said spring engaging the other of said cups and the other end of the spring engaging an end wall of said recess.

4. The combination set forth in claim 1, wherein said actuator cylinder comprises a tubular member and a pair of end cap members, said cap members having fluid pressure ports and passages, said locking collar having a passage in juxtaposition with one of said passages for conducting fluid pressure to and from one side of said actuator piston.

5. The combination set forth in claim 1, wherein said lock release piston is provided with oppositely extending rod portions, one of said rod portions having a passage therein for relieving trapped fluid from behind the lock release piston.

6. The combination set forth in claim 1, wherein said actuator cylinder comprises a tubular member having exteriorly threaded end portions and cap members threadedly engaging said threaded portions, and wherein said shaft is rotatably mounted in bearings having inner and outer races in one of said cap members, one end of said tubular member cooperating with said one cap member to support the outer races of said bearings.

7. An actuator including in combination, a cylinder, a lineally movable piston in said cylinder capable of fluid pressure actuation in either direction, a first member rotatably supported in said cylinder, a second nonrotatable member in said cylinder having operative engagement with said rotatable member, one of said members being operatively connected to said piston and constrained to move lineally therewith, the construction and arrangement being such that relative rotation occurs between said members upon lineal movement of said piston, locking means operatively connected with the rotatable member for preventing rotation of the rotatable member and consequent lineal movement of the piston, and fluid pressure operated means for releasing said locking means to permit rotation of said rotatable member and consequent lineal movement of said piston upon application of fluid pressure to either side of said piston, said locking means comprising a first locking element anchored to said cylinder and having a toothed edge surface, a second locking element operatively connected to said rotatable member and having a toothed edge surface disposed in contiguous relation to the toothed edge of said first locking element, the operative connection between the second locking element and the said rotatable member permitting relative axial movement therebetween but preventing relative rotation therebetween, and resilient means normally maintaining the toothed surfaces of said locking elements in engagement, said lock releasing means comprising a lock release cylinder formed within an end wall of the actuator cylinder, a lock release piston disposed in said lock release cylinder and mounted for reciprocal movement therein, and means operatively connected with said lock release piston and engageable with said second locking element for moving the second locking element axially relative to the first locking element to disengage the toothed surfaces upon application of fluid pressure to one side of said lock release piston.

HOWARD M. GEYER.

No references cited.